United States Patent
Burke et al.

(10) Patent No.: US 11,060,017 B2
(45) Date of Patent: Jul. 13, 2021

(54) FORMULATIONS COMPRISING RECOVERED WATER AND A VISCOSIFIER AND ASSOCIATED METHODS

(71) Applicant: Independence Oilfield Chemicals LLC, The Woodlands, TX (US)

(72) Inventors: Christopher George Burke, Houston, TX (US); Chen Xiyuan, The Woodlands, TX (US); John R. Willingham, Cypress, TX (US); Matthew Kye Yocham, Conroe, TX (US); Jeffrey C. Dawson, Conroe, TX (US)

(73) Assignee: INDEPENDENCE OILFIELD CHEMICALS LLC, The Woodlands, TX (US)

( * ) Notice: Subject to any disclaimer, the term of this patent is extended or adjusted under 35 U.S.C. 154(b) by 233 days.

(21) Appl. No.: 16/323,416

(22) PCT Filed: Jul. 13, 2017

(86) PCT No.: PCT/GB2017/052074
§ 371 (c)(1),
(2) Date: Feb. 5, 2019

(87) PCT Pub. No.: WO2018/025010
PCT Pub. Date: Feb. 8, 2018

(65) Prior Publication Data
US 2019/0169489 A1 Jun. 6, 2019

Related U.S. Application Data

(60) Provisional application No. 62/371,382, filed on Aug. 5, 2016.

(51) Int. Cl.
*C09K 8/68* (2006.01)
*C09K 8/528* (2006.01)
(Continued)

(52) U.S. Cl.
CPC .............. *C09K 8/685* (2013.01); *C09K 8/528* (2013.01); *C09K 8/665* (2013.01); *C09K 8/845* (2013.01); *C09K 8/887* (2013.01); *C09K 8/90* (2013.01)

(58) Field of Classification Search
None
See application file for complete search history.

(56) References Cited

U.S. PATENT DOCUMENTS

2008/0287323 A1 11/2008 Li et al.
2014/0014349 A1 1/2014 Mason
(Continued)

FOREIGN PATENT DOCUMENTS

CA 104310628 A 1/2015
WO 2016086232 A1 6/2016

OTHER PUBLICATIONS

International Search Report for PCT/GB2017/052074 dated Oct. 11, 2017 (3 pages).

*Primary Examiner* — John J Figueroa
(74) *Attorney, Agent, or Firm* — Shumaker, Loop & Kendrick, LLP

(57) ABSTRACT

High viscosity fracturing fluids for fracturing a subterranean formulation are prepared by: (i) selecting recovered water; (ii) contacting said recovered water with a viscosifying agent, wherein said viscosifying agent is selected from fenugreek gum, tara gum, locust bean gum, guar gum and derivatives of the aforesaid; (iii) contacting said recovered water with one or more other additives for example with a cross-linking agent (A) for cross-linking said viscosifying agent, wherein contact of said recovered water with cross-linking agent (A) takes place when the pH of said recovered water is less than pH 6.5; (iv) adjusting the pH to pH 6.5-8.8.

20 Claims, 4 Drawing Sheets

(51) Int. Cl.
*C09K 8/90* (2006.01)
*C09K 8/88* (2006.01)
*C09K 8/84* (2006.01)
*C09K 8/66* (2006.01)

(56) References Cited

U.S. PATENT DOCUMENTS

| | | |
|---|---|---|
| 2014/0194327 A1 | 7/2014 | Hutchings et al. |
| 2015/0060062 A1 | 3/2015 | Shen et al. |
| 2016/0194552 A1 | 7/2016 | Agashe et al. |
| 2017/0037303 A1* | 2/2017 | Waller .................. C09K 8/605 |
| 2018/0030335 A1* | 2/2018 | McEwen ................ C09K 8/685 |

* cited by examiner

FORMULATIONS COMPRISING RECOVERED WATER AND A VISCOSIFIER AND ASSOCIATED METHODS

TECHNICAL FIELD

The invention relates to formulations and methods and particularly, although not exclusively, relates to formulations for use as high viscosity fracturing fluids, methods of making such fluids and the use of such fluids in hydraulic fracturing of subterranean formations.

BACKGROUND

Hydraulic fracturing is a process needed to produce oil and gas from unconventional reservoirs such as coal beds, tight sandstones and shales. In this process, a fracturing fluid is injected at a rate and pressure necessary to cause formation failure by inducing fractures or cracks in the formation. These cracks originate at the well-bore and radiate out into the formation. The common practice in unconventional reservoirs is to initiate entry into the reservoir with a small slug of acid pumped at low rates followed by injection of a low viscosity water pumped at increasing rate until the design pump rate is achieved. These high rates typically can range from 50 to 100 barrels per minute. In order to pump at these high rates, small amounts of friction reducers are added to the fluid. These friction reducers are normally 100 to 1,000 ppm of polyacrylamide polymers and copolymers. These low viscosity, friction reducer assisted fluids are referred to as slick-water and the process or treatment is referred to as slick-water fracturing.

Once the treatment achieves a desired rate, a small loading of propping agent or proppant is added to the fluid. Typically, most proppant comprises small-sized sand such as 0.25 pounds of 100 mesh sand per gallon of water. As the job proceeds, the amount of sand is systematically increased and at some point, the size of the sand may be increased to 40/70, 30/50 mesh and on occasion, 20/40 mesh frac sand that is well-rounded and near spherical. The purpose of the sand is so the resulting sand pack, being orders of magnitude more permeable than the formation, maintains a conductive pathway from the reservoir to the well-bore for the recovery of the reservoir fluids. The amount of sand commonly used in the fracturing treatment will range from 200,000 lb to 500,000 lb per fracturing stage and the water can commonly range from 2,000 to 7,000 barrels of water.

Normally, in the last 30-40% of the sand volume, it is common practice to change the fracturing fluid from a low viscosity fluid to a high viscosity fluid so that higher concentrations of proppant can be placed in the fracture. This change requires the introduction of a fluid composed of a gelling agent, such as guar gum or derivatived guar gums. Common concentrations will range 10 pounds to 35 pounds of polymer per 1,000 gallons of treating fluid. At times, the viscosity of these polymer solutions, referred to as linear gels, is adequate to transport moderately higher concentrations of proppant, as may be required.

However, in many reservoirs, even higher concentrations of proppant are required and must be transported with higher viscosity fluids. This viscosity is achieved by cross-linking the hydrated guar gum or guar-derivatives. Common cross-linking agents include borate salts such as boric acid, borax pentahydrate and decahydrate, sodium metaborate and sodium octaborate. Other cross-linking agents include zirconium and titanium compounds.

In unconventional reservoirs, the well construction requires a portion of the well-bore, once the drilling has reached the targeted interval, to be horizontally drilled. In order to produce economically from the horizontal section, the fracturing treatment is expected to create transverse fractures growing 90° from the well-bore. In this process, the fracturing interval or length is only a small portion of the total horizontal lateral length, requiring multiple fracturing treatments to cover the length of the lateral. In this process, a first fracturing treatment starts at the end or toe of the well and each successive treatment thereafter systematically approaches the heel or near-vertical section of well. In this multi-stage fracturing process, after each portion of the lateral has been fractured, it is isolated from further fluid flow by setting a plug or activating sliding sleeves or using other zonal isolation processes. Consequently, it is not uncommon for the number of fracturing treatments or stages to range from 15 to 50 stages per well so that water requirements for all the fracturing treatments can range from 1.2 to 15 million gallons of water.

Once all the stages have been fractured, the zone isolation devices are then removed or reversed to allow well clean-up, this being the recovery of the fracturing fluid. Also, in this clean-up process, the fractures close onto the sand pack to maintain a conductive channel between the reservoir and the well-bore. The recovered fracturing fluid is referred to as the flow-back water and is generally much more saline than the water initially injected into the well. In some cases, the salinity measured as total dissolved solids (TDS), can exceed 200,000 ppm of various dissolved formation salts. The recovered water is often sent to salt water disposal wells for disposal, which adds to the cost associated with the production of oil or gas.

After the clean-up phase, oil or gas will show, and at some time afterward, the recovered fluids are separated, with the oil or gas collected for commercialization.

Other waters associated with gas and oil recovery are the produced waters. These waters accompany the long-term production of oil and gas and originate from the reservoir. These waters, like flow-back water, can also be high salinity waters. This water, like flow-back water is commonly disposed of causing additional costs for the operator.

The preferred water to use in a fracturing process is fresh water due to its compatibility with most fracturing chemicals and since it is least likely to cause scale issues. However, often fresh water is in short supply and must be comingled with flow-back or produced water. In most occasions, the relative percent of the flow-back water is small in comparison to the fresh water used. It would be advantageous if produced or flow-back water could also be used to generate high viscosity fracturing fluids. However, it is found that it is difficult to produce a high viscosity fracturing fluid using high TDS water, since the high solids, in particular salts, in flow back or production water tends to reduce the effectiveness of cross-linkers used to cross-link gelling agents. As a result, a high viscosity suitably for carrying high levels of proppants, cannot readily be achieved.

In addition a further problem found, in general, is that it is very difficult to incorporate scale inhibitors into fracturing fluids comprising transition metal cross-linkers, since the scale inhibitors tend to chelate cross-linkers used in the fluid, which is undesirable.

SUMMARY

It is an object of the invention to address the above described problems.

BRIEF DESCRIPTION OF THE FIGURES

Specific embodiments of the invention will now be described, by way of example, with reference to the accompanying figures, in which.

DETAILED DESCRIPTION

Figure 1:
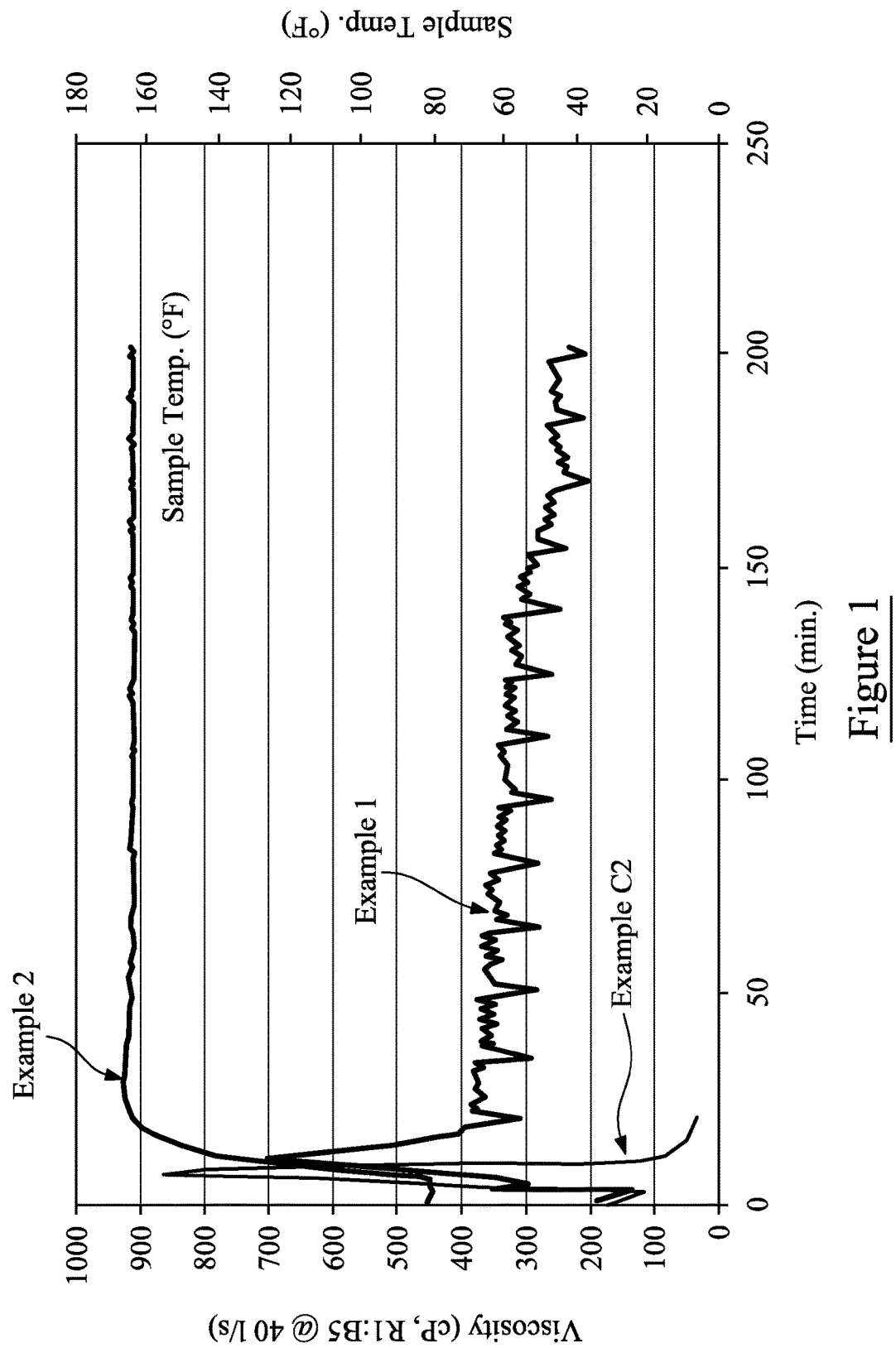
FIG. 1 is a graph of viscosity against time for selected formulations.

According to a first aspect of the invention, there is provided a method of preparing a fracturing fluid for fracturing a subterranean, formation, the method comprising:

(i) selecting recovered water, for example having high TDS;

(ii) contacting said recovered water with a viscosifying agent;

(iii) contacting said recovered water with one or more other additives;

(iv) adjusting the pH to pH 6.5-8.8.

Said recovered water may comprise any water which comprises dissolved solids. The recovered water may be from any source. Said recovered water is suitably saline and may have high salinity which may be defined in terms of total dissolved solids (TDS). Said recovered water may have a TDS of at least 50,000 ppm, suitably at least 100,000 ppm, preferably at least 150,000 ppm. Advantageously, the method described herein may be carried out using recovered water having greater than 200,000 ppm TDS or greater than 220,000 ppm TDS. The TDS may be less than 500,000 pm or less than 400,000 ppm. Said recovered water may comprise recovered fracturing fluid, for example flow-back water. Said recovered water may comprise water from a subterranean source, for example an underground aquifer or a subterranean formation. Said recovered water may comprise fresh water into which solids, for example, one or more salts, have been added and/or fresh water which has been mixed with saline water. In a preferred embodiment, said recovered water comprises recovered fracturing fluid, for example flow-back water; or produced water.

The ability to form a fracturing fluid of appropriate viscosity may not only be affected by the TDS but may also be affected by the concentration of specified ions. Advantageously, the method may be used to prepare a fracturing fluid using recovered water which includes:

greater than 50 ppm or greater than 100 ppm of Fe ions ($Fe^{2+}$ and $Fe^{3+}$); and/or greater than 1000 ppm or greater than 1500 ppm magnesium ions ($Mg^{2+}$); and/or greater than 10,000 ppm or greater than 20,000 ppm of calcium ions ($Ca^{2+}$); and/or greater than 500 ppm of strontium ions ($Sr^{2+}$); and/or greater than 200 ppm of boron ions ($B^{3+}$).

References to ppm of ions in said recovered water refer to the parts-per-million (by weight) (ppm) of the specified ions relative to the total weight of recovered water.

The pH of the recovered water selected in step (i) may be less than 6.5 or less than 6.0. It may be at least 3.5.

Said viscosifying agent is preferably arranged to be cross-linked to define a viscous material which is able to suspend particles in the fracturing fluid. Said viscosifying agent preferably comprises a polymer which may be a polysaccharide, for example a galactomannan. Said viscosifying agent may be selected from fenugreek gum, tara gum, locust bean gum, guar gum or derivatives of galactomannans such as the aforesaid. Preferably, however, a said derivative is not an ionic derivative for example a carboxylate derivative since such carboxylated polysaccharides can lead to problems. Preferably, said viscosifying agent is guar or a guar derivative which may be selected from methyl guar, hydroxyethyl guar and hydroxypropyl guar gum. More preferably, said viscosifying agent is guar which is non-derivatized.

In step (ii), preferably the method comprises contacting said recovered water with at least 0.1 wt %, (preferably at least 0.12 wt %, more preferably at least 0.16 wt %, especially at least 0.20 wt %) of said viscosifying agent (e.g. guar). The amount of said viscosifying agent may be less than 1.0 wt %, less than 0.50 wt %, or less than 0.40 wt %.

Said viscosifying agent used in step (ii) may comprise a dry powder or a slurry (e.g. a guar slurry) comprising the viscosifying agent and, optionally, refined oil and suspending agents. The slurry can comprise at least 20% (by weight of slurry) viscosifying agent, or at least 35% (by weight of slurry) viscosifying agent or at least 50% (by weight of slurry) of viscosifying agent. In addition, the slurry may comprise less than 75% (by weight of slurry) of viscosifying agent, less than 65% (by weight of slurry) of viscosifying agent, or less than 55% (by weight of slurry) of viscosifying agent.

After contact in step (ii), the viscosifying agent is suitably hydrated by the recovered water. Hydration may be diminished if the pH of the water which contains the viscosifying agent is greater than pH 6.5 and/or if high levels of borate ions are present in the recovered water. To address this problem, the method preferably comprises assessing the pH of the recovered water prior to step (ii) and, if the pH is greater than pH 6.5, taking steps to reduce the pH, for example before step (ii). The pH may be reduced by addition of an acid, for example an acidic buffer, such as acetic acid.

Preferably, immediately before step (ii), the pH of the recovered water with which the viscosifying agent is contacted in step (ii) is less than 6.5. The pH is preferably at least 5 or at least 5.5. When the pH is in a preferred range of at least pH 5.5 to less than pH 6.5, it is found that the viscosifying agent, especially guar gum, can satisfactorily hydrate, with minimum interference, for example by ions, such as borate ions.

Preferably, immediately after contact of recovered water with viscosifying agent in step (ii), the pH of the mixture is less than pH 6.5, for example at least pH 5.5 to less than pH 6.5.

The method preferably includes the step of contacting said recovered water with a cross-linking agent (A) for cross-linking said viscosifying agent, for example said guar. Contact of said recovered water with said cross-linking agent (A) may be after step (ii). In any event, preferably, contact of said recovered water with cross-linking agent (A) preferably takes place when the pH of said recovered water is less than pH 6.5, for example at least pH 5.0 or at least pH 5.5.

Said cross-linking agent (A) may be a metal (e.g. transition metal)—based cross-linker. It may comprise a zirconium or titanium complex. It preferably comprises a zirconium based complex. The concentration of metal (e.g. zirconium) in cross-linking agent (A) may be in the range 0.5 to 15 wt % as the metal oxide.

The ratio of the weight of transition metal (e.g. zirconium) in cross-linking agent (A) divided by the weight of viscosifying agent (e.g. guar) may be less than 0.005, or less than 0.003 or less than 0.0025. The ratio may be at least 0.001, or at least 0.015.

The ratio of the number of moles of transition metal (e.g. zirconium) in cross-linking agent (A) divided by the number of moles of viscosifying agent (e.g. guar) may be less than 100, preferably less an 70; the ratio may be at least 25 or at least 30.

Said cross-linking agent (A) is preferably stabilised by an alcohol amine. For example, the cross-linking agent (A) may include one or more alkanolamine ligands. Said agent (A) preferably includes one (or preferably more than one) ethanolamine, for example monoethanolamine, diethanolamine or triethanolamine ligands. The cross-linking agent (A) may be provided in an alcohol-based solution (e.g. being based on C1-6 linear or branched primary, secondary or tertiary alcohols). The combination of agent (A) and alcohol-based solution may be contacted with the recovered water in the method. A formulation which includes agent (A) and optional alcohol-based solution preferably includes less than 5 wt %, more preferably less than 1 wt %, especially substantially 0 wt % water.

In the method, cross-linking agent (A) is preferably arranged to deliver greater than 0.005 wt %, preferably greater than 0.008 wt % (and preferably less than 0.1 wt %, for example less than 0.05 wt %) of active agent, for example transition metal (e.g. zirconium) into the recovered water.

In the method, cross-linking agent (A) is preferably arranged to deliver greater than 0.005 wt %, preferably greater than 0.008 wt % (and preferably less than 0.1 wt %, for example less than 0.05 wt %) of active agent, for example transition metal (e.g. zirconium) into the recovered water.

Step (ii) suitably precedes step (iv). Step (iii) suitably precedes step (iv).

It is found, advantageously, that one or more other additives may be readily mixed with the recovered water in step (iii), before the pH is adjusted in step (iv). After the pH has been adjusted as described in step (iv), it can be more difficult to mix additives into the recovered water.

Step (iii) may precede step (ii), follow step (ii) or steps (ii) and (iii) may be undertaken substantially concurrently.

Preferably, after said viscosifying agent has been contacted with said recovered water in step (ii), and preferably after it has at least partially hydrated, one or more other additives may be contacted with the recovered water in step (iii).

In step (iii), additives (e.g. biocides, flow-back additives, iron control agents, clay control additives, paraffin inhibitors, corrosion inhibitors, cross-linking delay additives, scale inhibitors and/or thermal stabilisers) often or generally used in fracturing fluids may be contacted with the recovered water. In addition, gel degrading substances such as oxidizers or polysaccharide hydrolyase enzymes may be used. These enzymes can include amylases, pectinases, cellulase, hemicellulose or guar specific hydrolyase enzymes such as gammanse. The oxidizers can include hydrogen peroxide, calcium or magnesium oxide, alkali metal persulfates or sodium chlorite. Such additives may be incorporated into the fracturing fluid at their usual concentrations, for example in the range 0.25 to 10 gallons per 1000 gallons of fracturing fluid.

Advantageously, it has been found that scale inhibitors can be incorporated in and are compatible with the fracturing fluid described. Thus, in step (iii), said method preferably comprises contacting the recovered water with one or more scale inhibitors, for example phosphonate-based (e.g. polyphosphonate-based) or acrylate-based (e.g. polyacrylate based). In fresh water, it is found that scale inhibitors strongly chelate cross-linking agent (A). However, in the fracturing fluid described, addition of one or more scale inhibitors before addition of cross-linking agent (A) (and suitably before addition of any other cross-linker) shows no significant adverse effect and does not decrease the stability of the fracturing fluid when heated. Thus, the method preferably includes a step of contacting said recovered water with one or more scale inhibitors as described (e.g. to provide at least 0.01 wt %, at least 0.03 wt % or at least 0.05 wt % scale inhibitor in the fracturing fluid) before contact of said recovered water with cross-linking agent (A). The total amount of scale inhibitors in said fracturing fluid may be 0.1 to 10 gallons per thousand (gpt), preferably 0.2 to 2 gpt, more preferably 0.25 to 1.0 gpt.

In step (iii) or subsequent thereto, the method may include a step of contacting the recovered water with a cross-linking agent (B). Cross-linking agent (B) may be boron-based. However, such a cross-linking agent may not be required if the recovered water selected in step (i) includes a high level of boron ions. The boron compounds applicable for cross-linking agent (B) may include those commonly used to cross-link guar for hydraulic fracturing applications and include boric acid, alkali metal salts of tetraborate decahydrate, tetraborate pentahydrate, anhydrous tetraborate, metaborate, octaborate tetrahydrate as well as borate-based ores such as colemanite and ulexite. These can be added normally at 0 to 5 gpt, commonly at 0.1 to 1.5 gpt and most commonly from 0.25 to 1.0 gpt for the liquid-based borate crosslinkers, and in concentrations of the borate ion, these can range from 0 to 1000 ppm as a mixture of $B(OH)_3$ and $B(OH)_4^-$ ion, depending on fluid pH, but commonly between 50 and 800 ppm and more commonly between 100 and 600 ppm, depending on needed time for the high viscosity fluid and the temperature of the formation. Addition of the borate cross-linker is designed to increase the cross-linking rate. This rate can occur within 15 sec to 10 min, commonly 20 sec to 5 min and more commonly 30 sec to 2 min.

The ratio of the weight of transition metal (e.g. zirconium) in cross-linking agent (A) divided by the weight of boron added via cross-linking agent (B) (when provided) may be in the range 1:1 to 1:3.

The ratio of the number of moles of transition metal (e.g. zirconium) in cross-linking agent (A) divided by the number of moles of boron added via cross-linking agent (B) may be in the range 1:5 to 1:20.

Prior to step (iv), the method may include contact of the recovered water with one or more proppants. A said proppant may have a size of at least 140 US mesh; and it may have a size of less than 5 US mesh. The proppant may be selected from sand, bauxite and man-made intermediate or high strength materials.

The method may include incorporating at least 2 wt %, for example at least 5 wt %, proppants into said fracturing fluid.

Step (iv) is suitably undertaken after the majority, suitably at least 90 wt %, preferably at least 98 wt %, more preferably all, of the desired additives have been contacted with the recovered water. By doing this, the additives can be relatively easily dispersed, prior to any significant cross-linking which could otherwise be detrimental.

Step (iv) preferably includes the step of increasing the pH of the fracturing fluid. Thus, the method preferably includes the step of assessing the pH after step (iii) and during/after adjustment in step (iv). It is found, advantageously, that during and/or after step (iv) cross-linking of the viscosifying agent increases and the viscosity of the fracturing fluid increases to a suitably viscosity. The viscosity enhancement may occur within 10 seconds to 10 minutes, preferably between 30 seconds and 5 minutes and, more preferably, between 1 to 3 minutes of starting step (iv). The rate of cross-linking can be increased by using a higher concentration of a pH adjusting agent.

The pH adjusting agent may be a buffering agent. It is preferably an organic amine, for example a $C_2$-$C_{10}$ amine, that may be linear or branched. Said pH adjusting agent may be a $C_2$-$C_{10}$ alcohol amine, which may be linear or branched. Said pH adjusting agent may include multiple hydroxyl and/or amino groups on the molecule. Said pH adjusting agent may be selected from: Monoethanol amine (MEA), Diethanolamine, Diethanolmethylamine, Triethanolamine, N-Propanol amine, N-Dipropanol amine, N-Tripropanol amine, N-butanol amine, N-Dibutanol amine, Tributanol amine, Diaminoethane. The most preferred pH adjuster is monoethanolamine.

Said pH adjusting agent is preferably a buffer. Suitably, in step (iv), at least 0.01 wt %, preferably at least 0.05 wt %, more preferably at least 0.08 wt % of said pH adjusting agent is added. Less than 2 wt % or less than 1 wt % of said pH adjusting agent may be added.

According to a second aspect of the invention, there is provided a fracturing fluid made in the method of the first aspect. The fracturing fluid preferably includes recovered water which may have high TDS and/or has been recovered from a subterranean source, for example an underground aquifer or a subterranean formation. The fracturing fluid preferably includes a viscosifying agent as described in the first aspect, said viscosifying agent suitably being cross-linked, for example by cross-linking agent (A) as described in the first aspect. Said fracturing fluid preferably has a pH of at least 6.1. The pH may be 8.8 or less.

The fracturing fluid of the second aspect may have any feature of the fracturing fluid prepared as described according to the first aspect.

Said viscosifying agent preferably comprises a cross-linked polysaccharide, for example a cross-linked galactomannan. Preferably, said viscosifying agent is guar or a guar derivative. Said viscosifying agent is preferably a non-derivitized guar.

Said fracturing fluid preferably includes at least 0.1 wt %, especially at least 0.2 wt % of said cross-linked viscosifying agent, for example cross-linked guar. The amount of said viscosifying agent, for example cross-linked guar, may be less than 1.0 wt %.

Said viscosifying agent, for example said guar, may be cross-linked by a transition metal, preferably by titanium or zirconium. More preferably, said viscosifying agent is cross-linked by zirconium.

Said fracturing fluid may include other additives, selected from biocides, flow-back additive, ion control agents, scale inhibitors and/or thermal stabilisers. Preferably, said fracturing fluid includes one or more scale inhibitors. Said fracturing fluid may include 0.01 wt %. preferably at least 0.03 wt %, more preferably at least 0.05 wt % of scale inhibitors (i.e. the total amount of scale inhibitors may be as aforesaid). The scale inhibitors may be phosphonate-based or acrylate-based.

Said fracturing fluid may include a cross-linking agent (B). Said cross-linking agent (B) may be boron-based. Said cross-linking agent (B) may cross-link said viscosifying agent, for example guar.

Said fracturing fluid may include one or more proppants. Said fracturing fluid may include at least 2 wt %, for example at least 5 wt % or at least 10 wt % of proppants.

According to a third aspect of the invention, there is provided a method of fracturing a subterranean formation, the method comprising contacting the formation with a fracturing fluid made in a method as described according to the first aspect and/or being as described according to the second aspect. Said method preferably comprises fracturing a subterranean formation penetrated by a well by pumping the fracturing fluid into the well at a pressure sufficient to create a fracture network.

Any aspect of any invention described herein may be combined with any, feature described in any other aspect of any invention or embodiment described herein mutatis mutandis.

WORKING EXAMPLES

The following materials are referred to hereinafter:

GelTrol 120-a hydration buffer—a 20% aqueous solution of acetic acid;

GelTrol 600—a cross-linking buffer—a 85% aqueous solution of monoethanolamine;

XLW-Z25 and XLW Z20—primary zirconate-based cross-linkers. XLW—is an n-propanol solution containing Tetra kis[[2,2',2"-Nitrilotris[ethanolato]] and XLW Z20 is (1-)-N,O] Zirconium complex containing 4.5% (by weight) and 3.5% ((by weight) $ZrO_2$;

XLW-B2—a borate-based surface cross-linker comprising an aqueous solution comprising 11.4% boric acid;

GelTrol 156/GelTrol 120—hydration buffers comprising a 56% aqueous solution of acetic acid;

XLW-U2—a borate based delayed cross-linker comprising a ulexite-based (borate ore) slurry suspended in a potassium formate solution;

Guar slurry—gelling agent;

Microbreak™ GQ123—biocide;

ScaleCease™ 7001—Scale inhibitor;

MorFlo™ 400—Flowback surfactant.

The following tests are referred to hereinafter:

Test 1—Rheology Performance Test Procedure

Rheological performance tests were conducted to evaluate the stability and viscosity of high TDS cross-linked fluids over time at simulated reservoir temperature. A sample test sequence, preset on a Grace M5600 rheometer, is shown in Table 1. This test sequence runs the fluid at high shear during the first 3 minutes of the test to simulate the initial high shear period the fluid experiences as it moves through the surface equipment and down hole. This is done to test the shear stability of the high TDS fluid. The test is then run at 150° F. (65.6° C.) for one hour and then at 250° F. (121.1° C.) for two hours.

TABLE 1

Grace M5600 HPHT Performance Test Sequence

| Step No. | Elapsed Time (minutes) | Temperature (° F.) | Temp Error (° F.) | Shear Rate (1/s) | Cycle | Run Ramp |
|---|---|---|---|---|---|---|
| 1 | 3 | 75 | 10 | 500 | 0 | No |
| 2 | 15 | 150 | 10 | 40 | 4 | No |
| 3 | 15 | 250 | 10 | 40 | 8 | No |

The instructions provided to an operator are as follows:

A. Setting Up the Grace M5600 Rheometer:
1. Prepare the Grace M5600 unit for the rheology test by fitting a clean and dry B5 bob on the shaft.
2. Using the Grace M5600 software, zero the sheer stress. Then select the correct program sequence.
3. Start the program and create a new test name. Be sure to record all fluid formulation information in the electronic test file and test log before starting the test.

B. Preparation of the Linear Gel Sample:
4. Transfer 300 mL of produced source water to a clean, dry Waring® blender jar and set on the constant speed mixer; measure and record the water pH and temperature.
5. Adjust the water pH to around GelTrol™ 120 hydration buffer.
   NOTE: This is done in particular if the produced water contains >10 ppm of boron in order to have adequate polymer hydration.
6. Adjust the speed of the constant speed mixer to 2000 RPM.
7. Add the appropriate amount of guar slurry to the vortex of the water and simultaneously start the stop watch; mix at 2000 RPM for exactly 3 minutes.
8. At 3 minutes, stop the mixer; measure and record the linear gel viscosity using the Grace M3600 viscometer (this should be done using the R1:B1 rotor-bob configuration at 300 RPM). Measure the linear gel pH and record.

C. Preparation of the Cross-Linked Gel Sample:
NOTE: The order of addition of the additives, in particular the cross-linkers and buffer is important to the proper mixing of the High TDS fluid. The Ge/Trol™ 600 buffer should be added last to avoid pre-mature cross-linking of the gel due to boron that may be present in the produced source water.
9. Measure 250 mL of linear gel and transfer to the Waring® blender jar; set blender jar on the constant speed mixer.
10. Turn on constant speed mixer and adjust speed to 1000 RPM.
11. While mixing at 1000 RPM, add all additives to fluid except the XLW-Z25, XLW-B2, and the Ge/Trol™ 600.
12. To the fluid vortex, add the correct amount of XLW-Z25 and XLW-B2 cross-linkers and allow to mix 15 seconds at 1000 RPM to insure uniform dispersion in the fluid.
13. To cross-link the gel, add the correct amount of GelTrol™ 600 cross-linker buffer to the fluid and start the stopwatch.
14. Allow the fluid to mix at 1000 RPM for exactly 30 seconds and stop the mixer.

D. Initiating the Rheology Test:
15. Using a 60 mL syringe, collect 52 mL of the sample and quantitatively transfer to the rheometer cup
16. Immediately mount the cup with sample on the Grace M5600 rheometer assembly and pressurize the sample to 400 PSI with nitrogen gas.
17. Start the test sequence on the rheometer control software.
   NOTE: The first 3 minutes of the test is a high shear time period to test the shear resilience of the fluid.
18. After the initial 3 minutes, raise the heating bath around the rheometer sample cup.
19. Measure the initial pH of the cross-linked gel remaining in the Waring® blender and record.

E. Completing the Rheology Test:
20. At the completion of the test, lower the heating bath and allow to cool to at least 90° F. (32.2° C.); a glass beaker filled with ice water can be used to expedite the cooling process.
21. Switch the nitrogen pressure to the OFF position using the main pressure switch lever on the side of the M5600.
22. Carefully evacuate the test fluid from the cup and collect in a plastic beaker.
23. Record the condition of the fluid, i.e., color, consistency, etc., and measure and record the final pH.
24. Save pH measurements and all relevant test data into the appropriate file using the Grace software.
25. Clean the B5 bob, anti-climber, sample cup, and rheometer shaft using mild soap and water.
26. Back down the pressure using the rotating pressure valve.

Example 1 and 2

Examples 1 and 2 (comparative) provide a comparison between the rheology of a fracture fluid in accordance with a preferred embodiment of the invention and a conventional borate-based fluid. Unless otherwise stated, the procedure described in Test 1 was used and the water analysis was as described below.

| Properties (72° F.): | |
|---|---|
| pH | 5.71 |
| Specific Gravity | 1.13 |
| Density ($lb_m$/gal) | 9.4 |
| Total Dissolved Solids (ppm) | 183,680 |
| Hardness Cations (mg/L): | |
| Calcium ($Ca^{+2}$) | 11,426 |
| Magnesium ($Mg^{+2}$) | 1,439 |
| Barium ($Ba^{+2}$) | 3.15 |
| Strontium ($Sr^{+2}$) | 667 |
| Anions (mg/L): | |
| Chlorides ($Cl^-$) | 114,808 |
| Sulfates ($SO_4^{-2}$) | 1,244 |
| Phosphate ($PO_4^{-3}$) | 9.0 |
| Alkalinity (mg/L): | |
| Bicarbonates ($HCO_3^-$) | 67.1 |
| Carbonates ($CO_3^{-2}$) | 0 |
| Hydroxide ($OH^-$) | 0 |
| Select Ions (mg/L): | |
| Sodium ($Na^+$) | 59,114 |
| Boron ($B^{+3}$) | 35 |
| Iron ($Fe^{+2} \cdot Fe^{+3}$) | 39 |
| Other Cations (mg/L): | |
| Potassium ($K^+$) | 1,242 |
| Lithium ($Li^+$) | 14 |
| Manganese ($Mn^+$) | 2 |

| | |
|---|---|
| Lead (Pb$^{+2}$) | — |
| Silicon (Si$^+$) | 10.35 |
| Zinc (Zn$^{+2}$) | 0.5 |

The specific fluid formulations used are detailed in the Table below.

| | | Loadings (gpt) | | |
|---|---|---|---|---|
| Additives* | Function | Example 2 (Comparative) | Example 1 | Wt % Active |
| GelTrol™ 156 | Hydration Buffer | 0.12 | | 0.01 |
| 4.0 lb/gal Guar Slurry | Gelling Agent | 6.25 | | 0.30 |
| XLW-Z20 | Primary Crosslinker (Zr) | — | 0.25 | 0.002 |
| XLW-U2 | Delayed Crosslinker (B) | | 0.25 | 0.035 |
| XLW-B2 | Surface Crosslinker (B) | 0.25 | — | 0.003 |
| GelTrol™ 600 | Crosslinking Buffer | 2 | | 0.17 |

*Note:
Additives are listed in mixing order

The tests were conducted at a shear rate of 500 s$^{-1}$ for the first 3 minutes of the test, then reduced to 40 s$^{-1}$ in order to demonstrate the shear resiliency of the cross-linked fluid at 165° F. (73.9° C.). Results are provided in FIG. 1. It is clear from FIG. 1 that the Example 1 formulation which includes boron and zirconium based cross-linkers outperforms the treatment fluid of Example 2 (comparative).

Examples 3 to 5

Examples 3 to 5 illustrate how the performance of a zirconate-based primary cross-linker (XLW-Z25) in combination with a borate-based surface cross-linker yields significantly higher viscosity compared to use of either cross-linker alone.

Unless otherwise states the procedure described in Test 1 was used and the water analysis was as described below:

| Properties (72° F.): | |
|---|---|
| pH | 5.71 |
| Specific Gravity | 1.16 |
| Density (lb$_m$/gal) | 9.7 |
| Total Dissolved Solids (ppm) | 254,715 |
| Hardness Cations (mg/L): | |
| Calcium (Ca$^{+2}$) | 17,370 |
| Magnesium (Mg$^{+2}$) | 1066 |
| Barium (Ba$^{+2}$) | 17 |
| Strontium (Sr$^{+2}$) | 1467 |
| Anions (mg/L): | |
| Chlorides (Cl$^-$) | 162,373 |
| Sulfates (SO$_4^{-2}$) | 1,488 |
| Phosphate (PO$_4^{-3}$) | 13 |
| Alkalinity (mg/L): | |
| Bicarbonates (HCO$_3^-$) | 171 |
| Carbonates (CO$_3^{-2}$) | 0 |
| Hydroxide (OH$^-$) | 0 |
| Select Ions (mg/L): | |
| Sodium (Na$^+$) | 76,974 |
| Boron (B$^{+3}$) | 376 |
| Iron (Fe$^{+2}$•Fe$^{+3}$) | 167 |
| Other Cations (mg/L): | |
| Potassium (K$^+$) | 7209 |
| Lithium (Li$^+$) | 40 |
| Manganese (Mn$^+$) | 21 |
| Lead (Pb$^{+2}$) | 0 |
| Silicon (Si$^+$) | 34 |
| Zinc (Zn$^{+2}$) | 25 |

The specific fluid formulations used are detailed in the Table below.

| | | Loadings (gpt) | | | |
|---|---|---|---|---|---|
| Additives* | Function | Example 3 | Example 4 (comparative) | Example 5 (comparative) | wt % Active |
| GelTrol™ 156 | Hydration Buffer | | 0.12 | | 0.01 |
| MicroBreak™ GQ 123 | Biocide | | 0.25 | | 0.03 |
| 4.0 lb/gal Guar Slurry | Gelling Agent | | 7.50 | | 0.36 |
| ScaleCease™ 7001 | Scale Inhibitor | | 0.25 | | 0.01 |
| MorFlo™ 400 | Flowback Surfactant | | 0.50 | | 0.01 |
| XLW-Z25 | Primary Cross-linker (Zr) | 0.40 | 0.40 | 0 | 0 to 0.01 |
| XLW-B2 | Surface Cross-linker (B) | 0.50 | 0 | 0.50 | 0 to 0.01 |
| GelTrol™ 600 | Cross-linking Buffer | 1.00 | 1.00 | 1.00 | 0.09 |

*Note:
Additives are listed in mixing order

Figure 2:
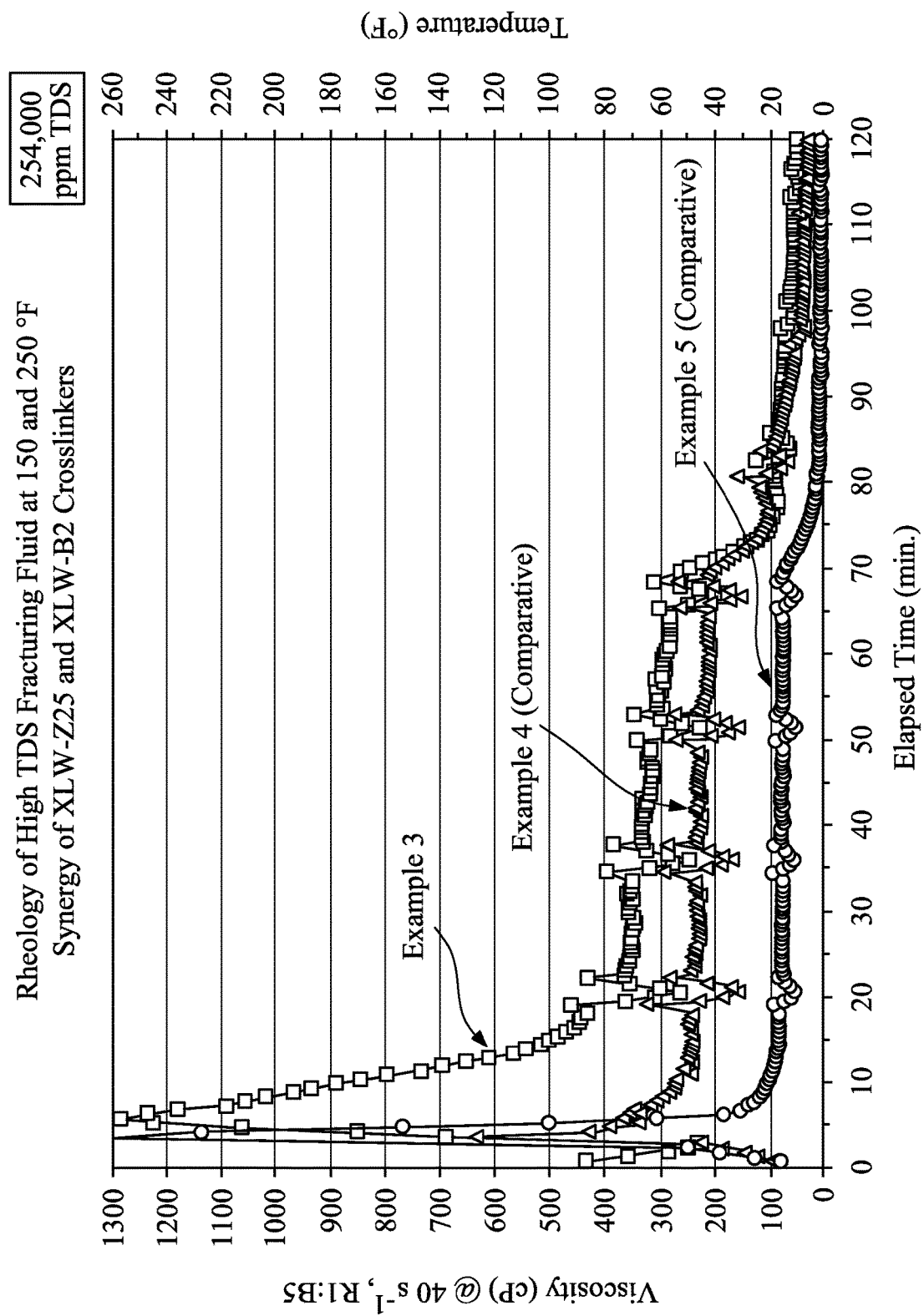
FIG. 2 is a graph of viscosity against time for selected formulations.

The tests were conducted at a temperature of 150° F. (65.6° C.) to illustrate performance upon reservoir cool-down, and then raised to 250° F. (121.1° C.) which simulates the reservoir bottom hole static temperature (BHST) to test the robustness of the fluid. Results are provided in FIG. 2 which clearly show the improvement of the example 3 formulation.

Examples 6 and 7

Examples 6 and 7 illustrate different performance of two unfunctionalised, different guar grades, namely 40/45 guar and 35/40 guar. Tests are undertake generally in accordance with Test 1 in produced water containing over 250,000 TDS having an analysis as detailed below:

| Properties (72° F.): | |
|---|---|
| pH | 5.71 |
| Specific Gravity | 1.16 |
| Density (lb$_m$/gal) | 9.7 |
| Total Dissolved Solids (ppm) | 254,715 |
| Hardness Cations (mg/L): | |
| Calcium (Ca$^{+2}$) | 17,370 |
| Magnesium (Mg$^{+2}$) | 1066 |
| Barium (Ba$^{+2}$) | 17 |
| Strontium (Sr$^{+2}$) | 1467 |

-continued

| Anions (mg/L): | |
|---|---|
| Chlorides (Cl$^-$) | 162,373 |
| Sulfates (SO$_4^{-2}$) | 1,488 |
| Phosphate (PO$_4^{-3}$) | 13 |
| Alkalinity (mg/L): | |
| Bicarbonates (HCO$_3^-$) | 171 |
| Carbonates (CO$_3^{-2}$) | 0 |
| Hydroxide (OH$^-$) | 0 |
| Select Ions (mg/L): | |
| Sodium (Na$^+$) | 76,974 |
| Boron (B$^{+3}$) | 376 |
| Iron (Fe$^{+2}$•Fe$^{+3}$) | 167 |
| Other Cations (mg/L): | |
| Potassium (K$^+$) | 7209 |
| Lithium (Li$^+$) | 40 |
| Manganese (Mn$^+$) | 21 |
| Lead (Pb$^{+2}$) | 0 |
| Silicon (Si$^+$) | 34 |
| Zinc (Zn$^{+2}$) | 25 |

The specific fluid formulations used are detailed in the Table below.

| | | Loadings (gpt) | | wt % |
|---|---|---|---|---|
| Additives* | Function | Example 6 | Example 7 | Active |
| GelTrol ™ 156 | Hydration Buffer | 0.12 | | 0.01 |
| 4.0 lb/gal Guar Slurry | Gelling Agent | 7.50 | 7.50 | 0.36 |
| MicroBreak ™ GQ 123 | Biocide | 0.25 | | 0.03 |
| ScaleCease ™ 7001 | Scale Inhibitor | 0.25 | | 0.01 |
| MorFlo ™ 400 | Flowback Surfactant | 0.50 | | 0.01 |
| XLW-Z25 | Primary Crosslinker (Zr) | 0.50 | | 0.01 |
| XLW-B2 | Surface Crosslinker (B) | 0.25 | | 0.003 |
| GelTrol ™ 600 | Crosslinking Buffer | 2.50 | | 0.21 |

*Note:
Additives are listed in mixing order

Figure 3:
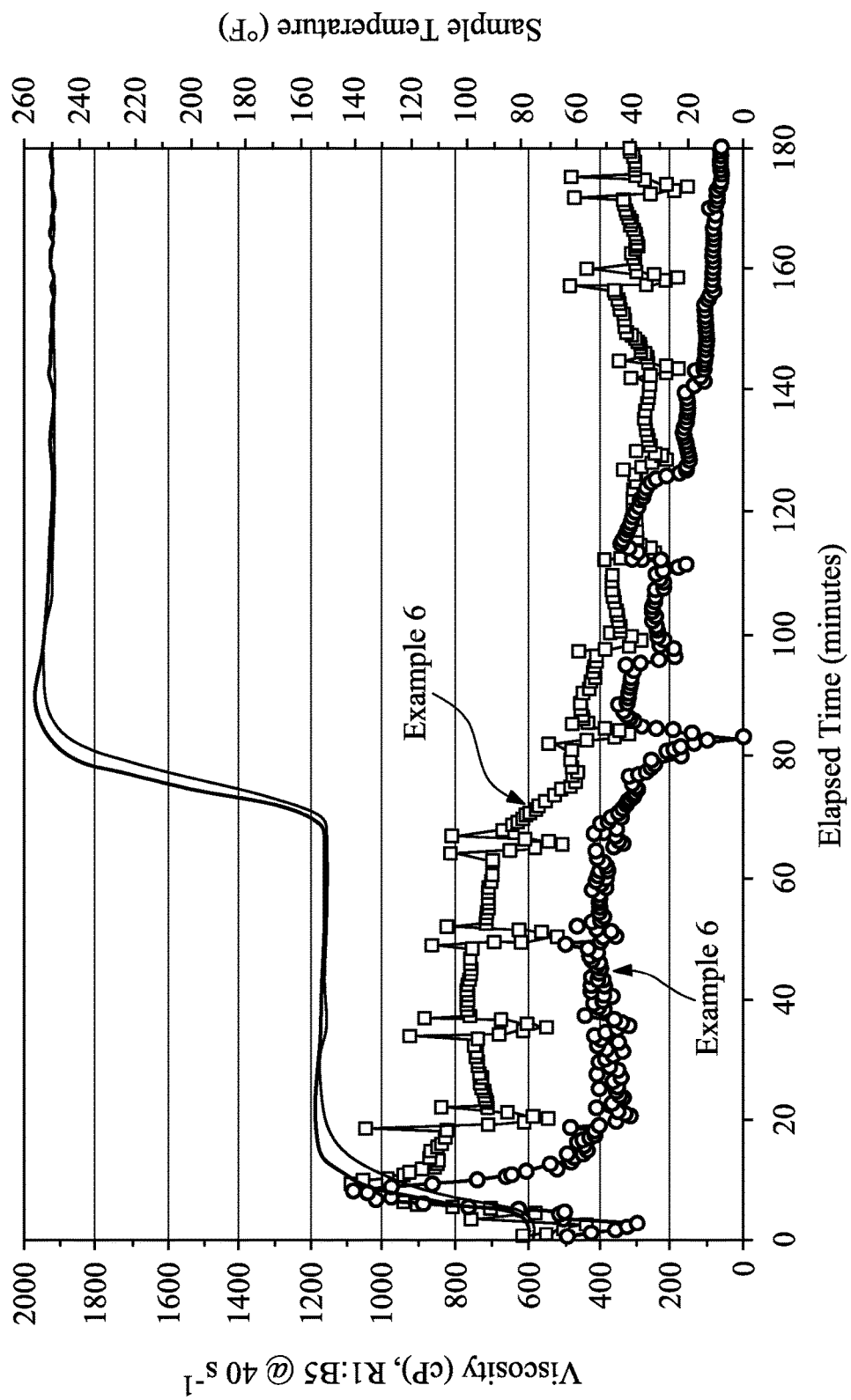
FIG. 3 is a graph of viscosity versus time for further selected formulations.

Tests were conducted at a temperature of 150° F. (65.6° C.) to illustrate performance upon reservoir cool-down, and then raised to 250° F. (121.1° C.), which simulates the reservoir BHST to test the robustness of the fluid. Results are provided in FIG. 3. The solid lines are the corresponding fluid temperature profiles. Note the significantly higher cross-linked viscosity of the fluid using 40/45 grade guar gum over the duration of the test. No gel stabilizer was used in these tests.

Examples 8 to 10

These examples illustrate that the formulations described can be used with scale inhibitors and viscosity of the formulations is maintained at an acceptable level.

Unless otherwise stated, the procedure described in Test 1 was used and the water analysis was as described below.

| Properties: | |
|---|---|
| pH (72° F.) | 7.01 |
| Specific Gravity (72° F.) | 1.06 |
| Density (72° F.), lb$_m$/gal | 8.83 |
| Total Dissolved Solids (ppm) | 95,750 |
| Hardness Cations (mg/L): | |
| Calcium (Ca$^{+2}$) | 717.95 |
| Magnesium (Mg$^{+2}$) | 140.56 |
| Barium (Ba$^{+2}$) | 2.39 |
| Strontium (Sr$^{+2}$) | 544.15 |
| Anions (mg/L): | |
| Chlorides (Cl$^-$) | 57,969 |
| Sulfates (SO$_4^{-2}$) | 266 |
| Phosphate (PO$_4^{-3}$) | 4.5 |
| Alkalinity (mg/L): | |
| Bicarbonates (HCO$_3^-$) | 831 |
| Carbonates (CO$_3^{-2}$) | 0 |
| Hydroxide (OH$^-$) | 0 |
| Select Ions (mg/L): | |
| Sodium (Na$^+$) | 36,465 |
| Boron (B$^{+3}$) | 23.11 |
| Iron (Fe$^{+2}$) | 55.78 |
| Other Cations (mg/L): | |
| Aluminium (Al$^+$) | 0.17 |
| Potassium (K$^+$) | 273.46 |
| Lithium (Li$^+$) | 23.00 |
| Manganese (Mn$^+$) | 1.03 |
| Silicon (Si$^+$) | 14.10 |
| Zinc (Zn$^{+2}$) | 0.04 |

The specific fluid formulations used are detailed in the Table below.

| | | Loadings (gpt) | | | |
|---|---|---|---|---|---|
| Additives* | Function | Example 8 No scale inhibitor | Example 9 With Phosphonate scale inhibitor | Example 10 With Polyacrylate scale inhibitor | wt % Active |
| GelTrol ™ 120 | Hydration Buffer | | 2.60 | | 0.05 |
| MicroBreak ™ GQ 123 | Biocide | | 1.00 | | 0.10 |
| 4.0 lb/gal Guar Slurry | Gelling Agent | | 7.50 | | 0.36 |
| ScaleCease ™ 7001 | Scale Inhibitor | 0 | 1.00 | 0.00 | 0.03 |
| ScaleCease ™ 7007 | Scale Inhibitor | 0 | 0.00 | 1.00 | 0.03 |
| XLW-Z25 | Primary Crossliner (Zr) | | 0.40 | | 0.01 |
| GelTrol ™ 600 | Crosslinking Buffer | | 1.20 | | 0.10 |

*Note:
Additive are listed in mixing order

Figure 4:
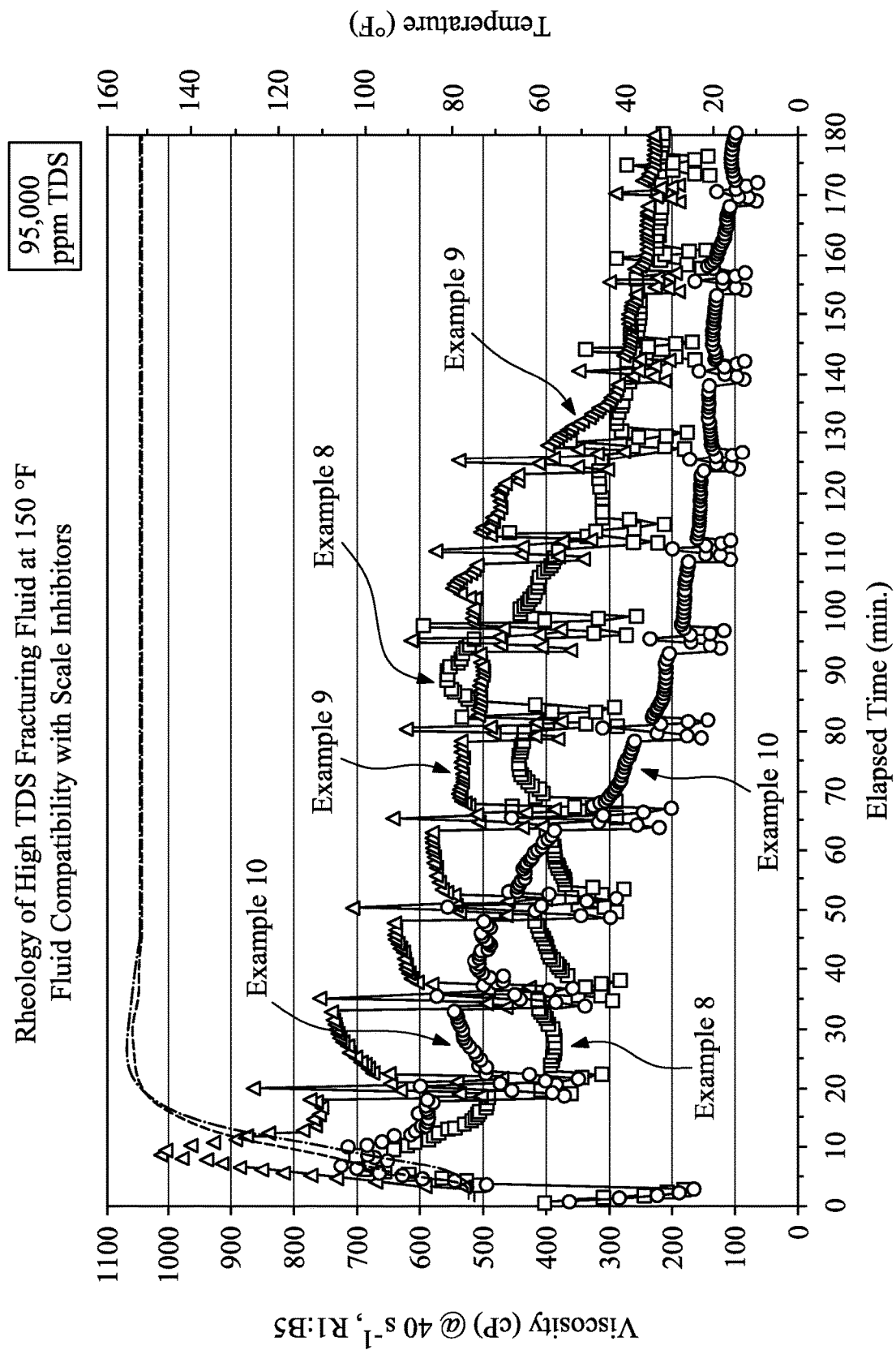
FIG. 4 is a graph of viscosity versus time for further formulations

The tests were conducted at 150° F. Results are provided in FIG. 4. Although the polyacrylate-type scale inhibitor drops in viscosity (example 10), it still maintains at least 200 cP for about 90 minutes of elapsed time.

Example 11

This example illustrates that formulations described have shear-thinning, non-shear degrading properties when formulated with high TDS water.

The specific fluid formulation assessed is detailed in the Table below.

| Additives | Function | Loading (gpt) | Wt % |
|---|---|---|---|
| Microbreak ™ GQ 123 | Biocide | 1.00 | 0.10 |
| GelTrol ™ 120 | Hydration Buffer | 2.60 | 0.05 |
| LFC-G4 | Gelling Agent | 7.50 | 0.36 |
| ScaleCease ™ 7029 | Scale Inhibitor | 0.25 | 0.01 |
| XLW-Z25 | Crosslinker | 0.40 | 0.01 |
| GelTrol ™ 600 | Crosslink Buffer | 1.20 | 0.10 |

In the test, the fluid formulation which had been cross-linked as described had an elastic appearance. A receptacle containing the elastic fluid was placed on the base of a Waring blender and mixed at high shear (74000 rpm) for about 1 minute. The fluid was found still to have an elastic character after shearing which confirms the formulation, comprising high TDS water, did not significantly degrade with shear. In comparison, conventional fracturing fluids which had been cross-linked with zirconium were found to degrade (and not re-heal) after a period at high shear.

The invention claimed is:

1. A method of preparing a fracturing fluid for fracturing a subterranean formulation, the method comprising:
   (i) selecting recovered water;
   (ii) contacting said recovered water with a viscosifying agent;
   (iii) contacting said recovered water with one or more other additives; and
   (iv) adjusting the pH to pH 6.5-8.8; and
   assessing the pH of the recovered water prior to step (ii) and, if the pH is greater than pH 6.5, taking steps to reduce the pH.

2. The method according to claim 1, wherein said recovered water has a total dissolved solids (TDS) of at least 150,000 ppm.

3. The method according to claim 1, wherein said recovered water includes:
   greater than 1000 ppm magnesium ions; and/or
   greater than 10,000 ppm of calcium ions; and/or
   greater than 500 ppm of strontium ions; and/or
   greater than 200 ppm of boron ions.

4. The method according to claim 1, wherein said viscosifying agent comprises a polysaccharide.

5. The method according to claim 1, wherein said viscosifying agent is selected from fenugreek gum, tara gum, locust bean gum, guar gum, and derivatives thereof.

6. The method according to claim 1, wherein said viscosifying agent is non-ionic.

7. The method according to claim 1, wherein said viscosifying agent is guar or a guar derivative.

8. The method according to claim 1, wherein said viscosifying agent is guar which is non-derivatized.

9. The method according to claim 1, which comprises contacting said recovered water with at least 0.15 wt % of said viscosifying agent; and less than 0.40 wt % of said viscosifying agent.

10. The method according to claim 1, wherein immediately before step (ii), the pH of the recovered water with which the viscosifying agent is contacted in step (ii) is less than 6.5.

11. The method according to claim 1, which includes the step of contacting said recovered water with a cross-linking agent (A) for cross-linking said viscosifying agent.

12. The method according to claim 11, wherein contact of said recovered water with cross-linking agent (A) takes place when the pH of said recovered water is less than pH 6.5.

13. The method according to claim 11, wherein said cross-linking agent (A) is a transition metal.

14. The method according to claim 11, wherein said cross-linking agent (A) is a zirconium-based complex.

15. The method according to claim 11, wherein said cross-linking agents (A) is stabilized by an alcohol amine.

16. The method according to claim 1, wherein after said viscosifying agent has been contacted with said recovered water in step (ii), one or more additives is contacted with the recovered water in step (iii).

17. The method according to claim 1, wherein in step (iii), said method comprises contacting the recovered water with one or more scale inhibitors.

18. The method according to claim 17, wherein said one or more scale inhibitors are selected from phosphonate-based and acrylate-based scale inhibitors.

19. The method according to claim 1, wherein, in step (iii) or subsequent thereto, the method includes a step of contacting the recovered water with a cross-linking agent (B) which may be boron-based.

20. The method according to claim 1, wherein step (iv) includes increasing the pH of the fracturing fluid to pH 6.5-8.8.

* * * * *